(12) United States Patent
Yu et al.

(10) Patent No.: US 9,104,068 B2
(45) Date of Patent: Aug. 11, 2015

(54) BACKLIGHT MODULE AND LCD DEVICE COMPRISING BACKLIGHT MODULE

(75) Inventors: Yajun Yu, Shenzhen (CN); Quan Li, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 386 days.

(21) Appl. No.: 13/503,085

(22) PCT Filed: Mar. 30, 2012

(86) PCT No.: PCT/CN2012/073333
§ 371 (c)(1),
(2), (4) Date: Apr. 20, 2012

(87) PCT Pub. No.: WO2013/143128
PCT Pub. Date: Oct. 3, 2013

(65) Prior Publication Data
US 2013/0258240 A1    Oct. 3, 2013

(30) Foreign Application Priority Data
Mar. 27, 2012    (CN) .......................... 2012 1 0082979

(51) Int. Cl.
G02F 1/1333    (2006.01)
G02F 1/1335    (2006.01)
F21V 8/00    (2006.01)

(52) U.S. Cl.
CPC ........ G02F 1/133608 (2013.01); G02B 6/0085 (2013.01); G02B 6/0091 (2013.01);
(Continued)

(58) Field of Classification Search
CPC ............... G02F 1/133615; G02F 2001/133607
USPC .................................. 349/62–69; 362/600–634
See application file for complete search history.

(56) References Cited

U.S. PATENT DOCUMENTS

2004/0170009 A1    9/2004    Ho
2010/0002418 A1    1/2010    Lin

FOREIGN PATENT DOCUMENTS

CN    101078835 A    11/2007
CN    101178507 A    5/2008
(Continued)

OTHER PUBLICATIONS

Duan Keyu, the International Searching Authority written comments, Jan. 2013, CN.
(Continued)

Primary Examiner — Phu Vu
(74) Attorney, Agent, or Firm — IPro, Inc.; Na Xu (57) ABSTRACT

The invention provides a backlight module and an LCD device including the backlight module. The backlight module includes an LGP, a lightbar optically coupled with the LGP, and an outer frame. The lightbar is arranged on the outer frame from the inner side of the backlight module. In the invention, because the lightbar is arranged on the outer frame of the backlight module, the lightbar can directly exchange heat with the outside air via the outer frame to dissipate heat; because the lightbar is directly arranged on the outer frame, the heat conduction path is shortened to a great extent. Thus, the heat emitted by the lightbar can be dissipated via the outer frame in time; the inside temperature of the backlight module is reduced, the stability and the service life of the components in the backlight module are increased, and the phenomenon that the stability of the LCD panel is affected by overhigh temperature is avoided.

18 Claims, 5 Drawing Sheets

(52) U.S. Cl.
CPC ..... *G02F1/133603* (2013.01); *G02F 1/133615* (2013.01); *G02F 2001/13332* (2013.01); *G02F 2001/133607* (2013.01); *G02F 2001/133628* (2013.01)

(56) References Cited

FOREIGN PATENT DOCUMENTS

| | | | |
|---|---|---|---|
| CN | 101303479 | A | 11/2008 |
| CN | 101307894 | A | 11/2008 |
| CN | 20080176233.7 | * | 11/2008 |
| CN | 101418917 | A | 4/2009 |
| CN | 201696950 | U | 1/2011 |
| CN | 102067018 | A | 5/2011 |
| CN | 102230588 | A | 11/2011 |
| CN | 102889501 | A | 1/2013 |
| EP | 2385402 | A2 | 11/2011 |
| KR | 100764447 | B1 | 10/2007 |

OTHER PUBLICATIONS

Ding Sha, the first office action, May 2013, CN.

* cited by examiner

BACKLIGHT MODULE AND LCD DEVICE COMPRISING BACKLIGHT MODULE

TECHNICAL FIELD

The invention relates to the field of liquid crystal displays (LCDs), and more particularly to a backlight module and an LCD device comprising the backlight module.

BACKGROUND

As a key component, a backlight module is mainly used for providing sufficient brightness and uniformly distributed light sources, to enable an LCD panel to normally display images.

Figure 1:
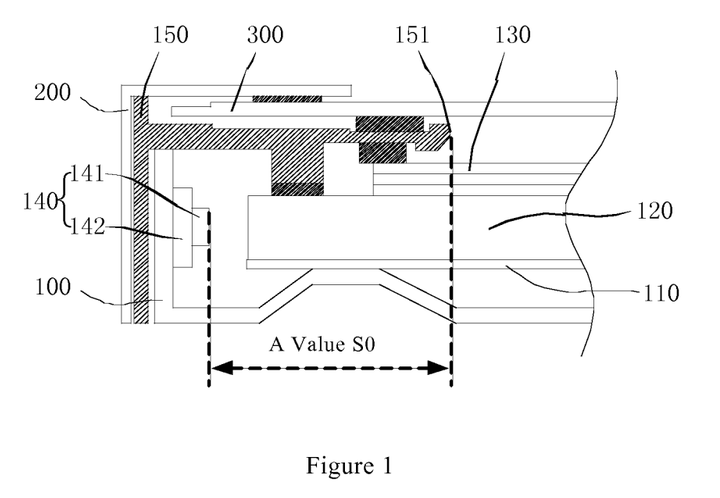
FIG. 1 is a simplified structure diagram of a conventional backlight module.

FIG. 1 shows a backlight module of an LCD device, including a backplane 100, a lightbar 140 fixed on the side wall of the backplane 100, a reflecting plate 110 arranged on the backplane 100, a light guide panel (LGP) 120 which is arranged on the reflecting plate 110 and opposite to the lightbar 140, a rubber frame 150 and an outer frame 200 which are arranged outside the backplane 100 and used for pressing the LGP 120; optical film(s) 130 is arranged on the light emitting surface of the LGP 120. An LCD panel 300 is fixed above the backlight module by components including the rubber frame 150, the outer frame 200 and the like. The lightbar 140 of such a structure is fixed on the backplane 100. In the inner cavity of the backlight module, the heat emitted by the lightbar 140 is conducted to the surface of the backplane 100 via the side wall of the backplane 100 and then is dissipated through air convection. However, because the heat conduction path is long, the heat is accumulated in the inner cavity of the backlight module for a long time, resulting in certain damage to the components in the backlight module. Thus, the components such as the reflecting plate 110, the LGP 120 and the like in the backlight module operate in a heat accumulating area for a long time and then deform, thereby affecting the stability and the service life of the components in the backlight module as well as the stability of the LCD panel, and reducing the display effect of the LCD device.

Figure 2:
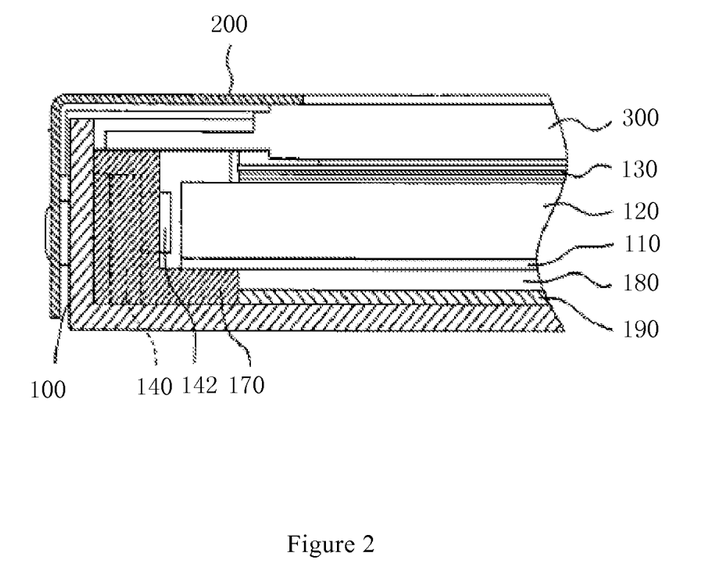
FIG. 2 is a simplified structure diagram of another conventional backlight module.

As shown in FIG. 2, U.S. Pat. Pub. No. US2010/0002418A1 discloses another backlight module, including a backplane 100, a heat conducting plate 190 closely attached to the backplane 100, a lightbar 140 fixed on the side wall of the backplane 100, an LGP 120 arranged opposite to LED(s) 142 of the lightbar 140, a reflecting plate 110 arranged below the LGP 120, and an outer frame 200 arranged outside the backplane 100; optical film(s) 130 is arranged on the light emitting surface of the LGP 120, and an LCD panel 300 is arranged above the backlight module. In addition, the backlight module further includes a support piece 170 which is used for supporting the reflecting plate 110 and the LGP 120 thereon. Thus, an air cavity 180 is formed between the heat conducting plate 190 and the reflecting plate 110, to play a role of heat insulation. However, although the influence of the heat on the reflection sheet 110, etc. is avoided during heat transfer as far as possible in the arranging mode, the heat conduction path remains that: heat is conducted to the backplane 100 via the heat conducting plate 190, and then dissipated through the contact between the backplane 100 and air. Because the heat conduction path is still long, the heat is accumulated inside the backlight module for a long time, thereby affecting the service life and safety of the components in the backlight module as well as the service life of the LCD panel of the LCD device.

SUMMARY

In view of the above-described problems, the aim of the invention is to provide a backlight module and an LCD device comprising the backlight module with good heat dissipation effect.

The aim of the invention is achieved by the following technical scheme.

A backlight module comprises an LGP, a lightbar optically coupled with the LGP, and an outer frame; the lightbar is arranged on the inner side of the outer frame.

Preferably, the backlight module comprises a rubber frame; the rubber frame is provided with a rubber frame side wall in the position corresponding to the lightbar, and the rubber frame side wall is provided with a through hole for receiving the lightbar. The light coupling path of the lightbar and the LGP penetrates through the through hole.

Preferably, the backlight module comprises a backplane; the backplane is provided with a backplane side wall in the position corresponding to the lightbar, and the backplane side wall is provided with a through hole for receiving the lightbar. The light coupling path of the lightbar and the LGP penetrates through the through hole.

Preferably, the lightbar further comprises heat sink(s) arranged thereon; the outer frame is provided with opening (s), and the heat sink is in contact with the outside air via the opening. The heat sink is in direct contact with the outside air, increasing the heat dissipation efficiency.

Preferably, the thickness of the heat sink is more than that of the outer frame, and the heat sink is extended from the outer frame to the outside of the backlight module. Thus, the contact area between the heat sink and air is added, and then the heat dissipation efficiency can be increased.

Preferably, the heat sink is radiating fins. The radiating fins can add the contact area between the heat sink and the air, and then increase the heat dissipation efficiency.

Preferably, the opening is a through hole with a size equivalent to the overall size of the radiating fins. The opening is easy to process, enables most of the radiating fins to be in contact with the air, and increases the heat dissipation efficiency.

Preferably, the outer frame is made of material with a good heat dissipation effect. The openings comprise a plurality of notches, each of which corresponds to each fin of the radiating fins, and the radiating fins are inserted in the notches. Because the outer frame is made of material with a good heat dissipation effect and is provided with notches which correspond to the radiating fins, and each fin of the radiating fins is inserted in the corresponding notch, the outer frame is in full contact with the radiating fins. Thus, the radiating fins can exchange heat with air, and can transfer heat to the outer frame to exchange heat with air in large area via the outer frame.

Preferably, the outer frame is provided with a lug boss extending to the inside of the backlight module in the position corresponding to the lightbar. The part of the lug boss extending to the inside of the backlight module is used for assembling and positioning. The assembling accuracy and efficiency are increased, and the area of the heat sink exposed in the air is added.

Preferably, the thickness of the heat sink is less than or equal to the depth of the lug boss. Thus, the part of the heat sink exposed outside the outer frame is just arranged in the lug boss, ensuring the contact area between the heat sink and air, and preventing the heat sink from protruding from both sides of the outer frame to affect the planeness of the outer frame of the LCD device.

Preferably, the outer frame is made of material with a good heat dissipation effect. Because the heat sink is in contact with the outer frame, the outer frame can be used for dissipating heat, thereby adding the heat dissipation path and heat dissipation area.

An LCD device comprises the aforementioned backlight module.

In the invention, because the lightbar is arranged on the outer frame of the backlight module, the lightbar can directly exchange heat with the outside air via the outer frame to dissipate heat; because the lightbar is directly arranged on the outer frame, the heat conduction path is shortened to a great extent; thus, the heat emitted by the lightbar can be dissipated via the outer frame in time; therefore, the inside temperature of the backlight module is reduced, the stability and the service life of the components in the backlight module are increased, and the phenomenon that the stability of the LCD panel is affected by overhigh temperature is avoided.

Legends: 100. backplane; 110. reflecting plate; 120. LGP; 130. optical film; 140. lightbar; 150. rubber frame; 170. support piece; 180. air cavity; 190. heat conducting plate; 141. LED; 142. PCB; 143. radiating fin; 151. inner edge; 200. outer frame; 210. lug boss; 211. opening; 300. LCD panel.

DETAILED DESCRIPTION

The invention will further be described in detail in accordance with the figures and the preferred example.

Figure 3:
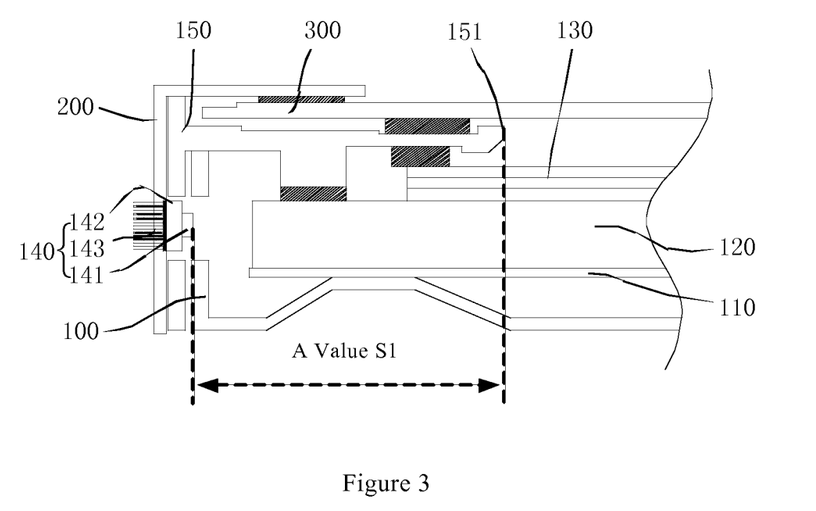
FIG. 3 is a simplified structure diagram of a backlight module of a first example of the invention.
Figure 5:
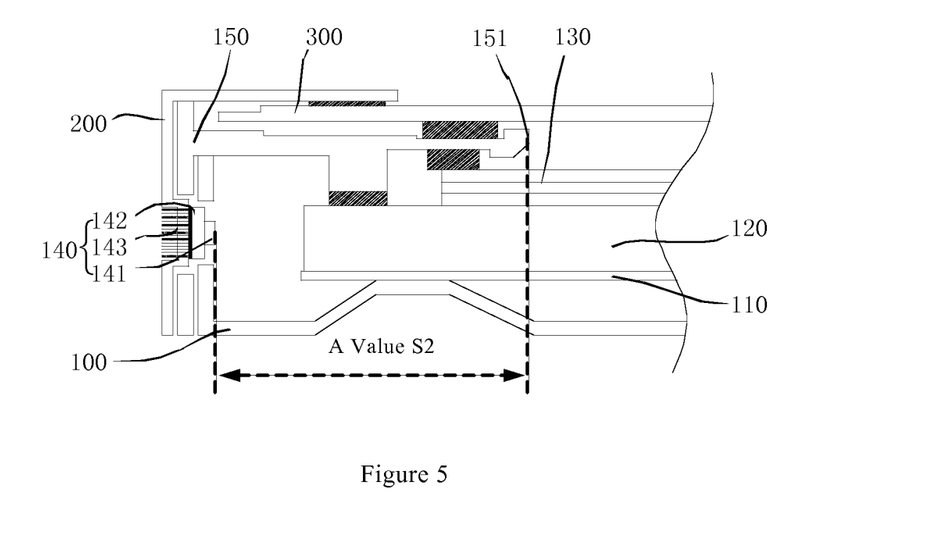
FIG. 5 is a simplified structure diagram of a backlight module of a second example of the invention.

FIG. 3 and FIG. 5 show a backlight module of the LCD device of the invention, comprising a backplane 100, a reflecting plate 110 arranged on the backplane 100, an LGP 120 which is arranged on the reflecting plate 110 and opposite to a lightbar 140, and a rubber frame 150 and an outer frame 200 which are arranged outside the backplane 100 and used for pressing the LGP 120; optical film(s) 130 is arranged on the light emitting surface of the LGP 120, and an LCD panel 300 is fixed above the backlight module by components comprising the rubber frame 150, the outer frame 200 and the like. The lightbar 140 used as a light source is directly arranged on the inner side surface of the outer frame 200, to dissipate heat via the outer frame. Because the lightbar 140 is directly arranged on the inner side surface of the outer frame 200, the heat conduction path is shortened to a great extent; thus, the heat emitted by the lightbar 140 can be dissipated via the outer frame 200 in time. Therefore, the inside temperature of the backlight module is reduced, the stability and the service life of the components in the backlight module are increased, and the phenomenon that the stability of the LCD panel is affected by overhigh temperature is avoided.

The following examples are several preferred examples of the invention.

Example 1

Figure 4:
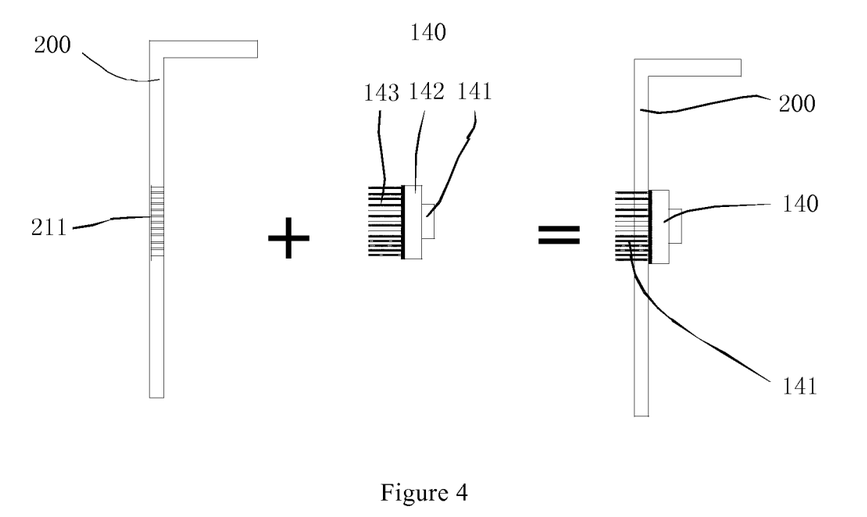
FIG. 4 is a simplified matching diagram of a lightbar and a rubber frame of a first example of the invention.

FIG. 3 shows a first example of the invention. As shown in the Figure, a backlight module of the LCD device comprises a backplane 100, a reflecting plate 110 arranged on the backplane 100, an LGP 120 which is arranged on the reflecting plate 110 and opposite to a lightbar 140, and a rubber frame 150 and an outer frame 200 which are arranged outside the backplane 100 and used for pressing the LGP 120; optical film(s) 130 is arranged on the light emitting surface of the LGP 120, and an LCD panel 300 is fixed above the backlight module by components comprising the rubber frame 150, the outer frame 200 and the like. As shown in FIG. 4, the lightbar 140 is arranged on the side wall of the outer frame 200. The back side of the printed circuit board (PCB) 142 of the lightbar 140 is provided with radiating fins 143. The radiating fins 143 are in contact with the air outside the outer frame 200 via the openings 211 of the outer frame 200 to dissipate heat. As shown in the Figure, the thickness of the radiating fins 143 exceeds that of the outer frame. Thus, the radiating fins can extend from the outer frame 200; the radiating fins 143 can be in contact with the air in large area, and then the heat dissipation efficiency can be improved. In the example, the outer frame 200 is made of aluminum material with a good heat dissipation effect. Optionally, the outer frame 200 can be made of other material with a good heat dissipation effect. The outer frame can also be used to dissipate heat. As shown in FIG. 4, the openings 211 of the side wall of the outer frame 200 comprises a plurality of notches, each of which respectively correspond to each fin of the radiating fins 143, to form multi-slit openings as gates, namely each fin of the radiating fins 143 is correspondingly inserted in the corresponding notch and closely attached to the notch, namely the radiating fins are closely attached to the outer frame 200. Thus, the contact area between the radiating fins 143 and the outer frame 200 is added, and the heat conductivity between the radiating fins 143 and the outer frame 200 is better, thereby facilitating the radiating fins 143 to conduct a part of heat emitted by the LED(s) 141 of the lightbar 140 onto the outer frame 200 in time, achieving the effect of simultaneously dissipating heat by the radiating fins 143 and the outer frame 200, and increasing the heat dissipation efficiency.

Figure 10:
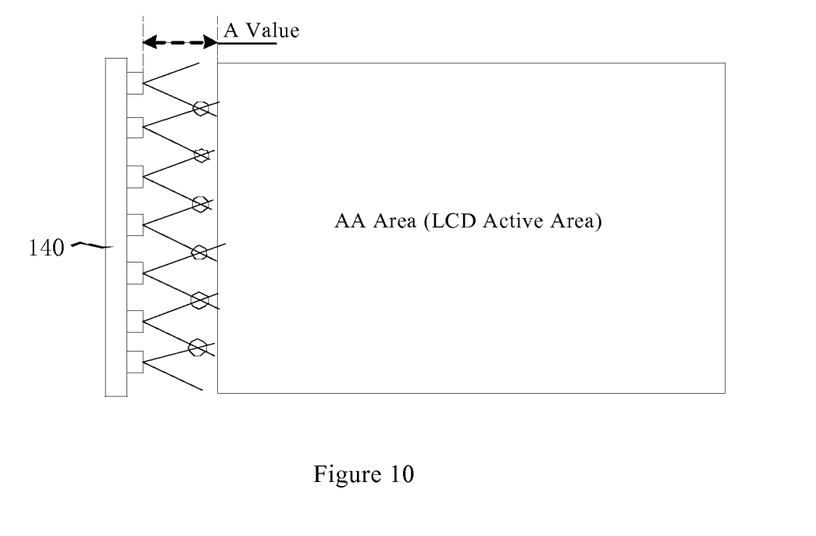
FIG. 10 is a distribution diagram of an A value and dark zones.

In addition, in the example, because the lightbar 140 is arranged on the outer frame 200, the backplane 100 and the rubber frame 150 of the backlight module will be provided with corresponding structures to make the optical coupling path of the lightbar 140 and the LGP 120 penetrate through. In the example, for example, the backplane 100 is provided with a backplane side wall in the position corresponding to the lightbar. The backplane side wall is provided with a through hole to receive the lightbar 140. The rubber frame 150 is provided with a rubber frame side wall in the position corresponding to the lightbar, and the rubber frame side wall is also provided with a through hole. Thus, the distance between the lightbar 140 and the inner edge 151 of the rubber frame 150 is simultaneously added, and then the A value of the backlight module is added. As shown in FIG. 3, the A value S1 of the backlight module of the first example is added about S1=S1−S0=d3+d4 in contract to the A value S0 of the conventional backlight module shown in FIG. 1, wherein d3 represents a thickness of the backplane, and d4 represents thickness of the rubber frame. In this case, as shown in FIG. 10, dark zones (i.e. hotspot) formed between every two LEDs of the lightbar 140 occur outside the active area (AA area), thereby increasing the optical taste of the backlight module and the display effect of the LCD device.

In the example, the heat sink may be replaced by a plate with a good heat dissipation effect, i.e. the plate may be not provided with radiating fins, and may be in contact with the air outside the rubber frame via the plate-shape heat sink to dissipate heat and in contact with the rubber frame to dissipate heat via the rubber frame.

In the example, the heat dissipation effect is achieved by the heat exchange between the radiating fins 143 and the outer frame 200 with the outside air. Therefore, the outer frame 200 and the radiating fins 143 of the invention are preferably made of aluminum material, copper material or other material with a good heat dissipation effect.

Example 2

Figure 6:
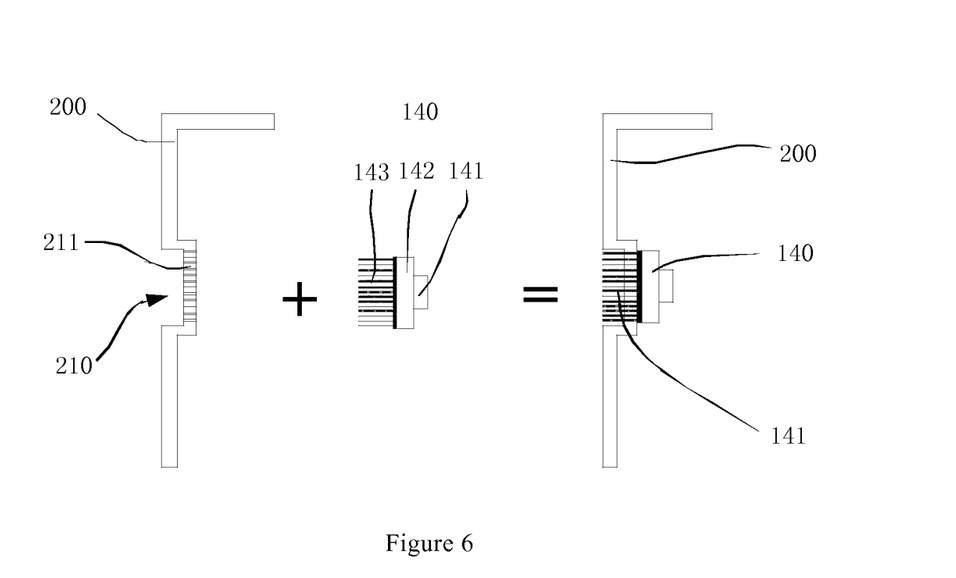
FIG. 6 is a simplified matching diagram of a lightbar and a rubber frame of a second example of the invention

FIG. 5 shows a second example of the invention. The second example is different from the first example in that: as shown in FIG. 6, in this example, a lug boss 210 extending to the inside of the backlight module is arranged in the position corresponding to the lightbar 140 of the outer frame 200, and the lug boss 210 corresponds to a pit formed by the through holes of the backplane 100 and the rubber frame 150. The aim is to facilitate positioning when assembling the backlight module, and increase the assembling accuracy and efficiency. Moreover, the thickness of the radiating fins 143 extending from the outer frame is set to be equal to or less than the depth of the lug boss 210; thus, the radiating fins 143 are fully inserted in the lug boss 210, ensuring that the radiating fins 143 are in contact with air in large area, and preventing the radiating fins 143 from protruding from both sides of the outer frame 200 to affect the planeness of the outer frame of the LCD device.

In the example, the depth of the lug boss 210 is set as required, to enable the depth of the lug boss extending to the inside of the backlight module to be less than the thickness of the lightbar 140. Thus, the A value of the backlight module is added. In the example, the added value of the A value is S2=S2−S0=d1+d2, wherein, d1 represents a thickness of the LED 141, and d2 represents a thickness of the PCB 142. Therefore, the hotspot of the LCD device is eliminated, and the display effect of the LCD device is increased.

Figure 7:
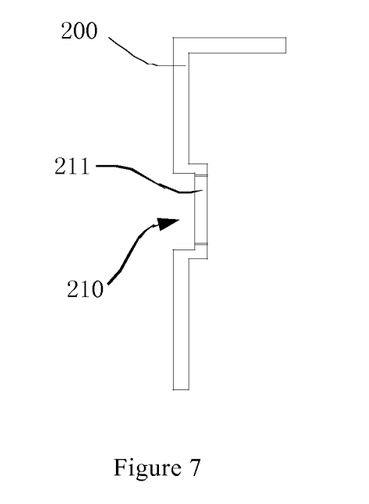
FIG. 7 is a simplified diagram of an outer frame of a first example of the invention.
Figure 8:
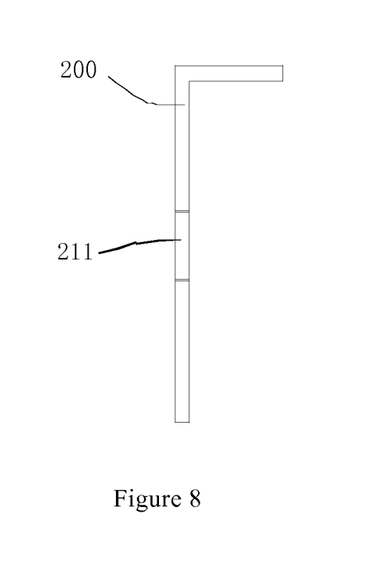
FIG. 8 is another simplified diagram of an outer frame of a second example of the invention.

The above examples are two preferred examples of the invention. In the two examples of the invention, as shown in FIG. 7 and FIG. 8, to simplify the processing technology of the openings 211, the openings 211 can be made into through holes with a size corresponding to the overall size of the radiating fins, to increase the production efficiency. When the outer frame 200 is made of plastic material with a poor heat conductivity, the openings of this type can add the contact area between the radiating fins and air as possibly, and increase the heat dissipation efficiency of the radiating fins.

Figure 9:
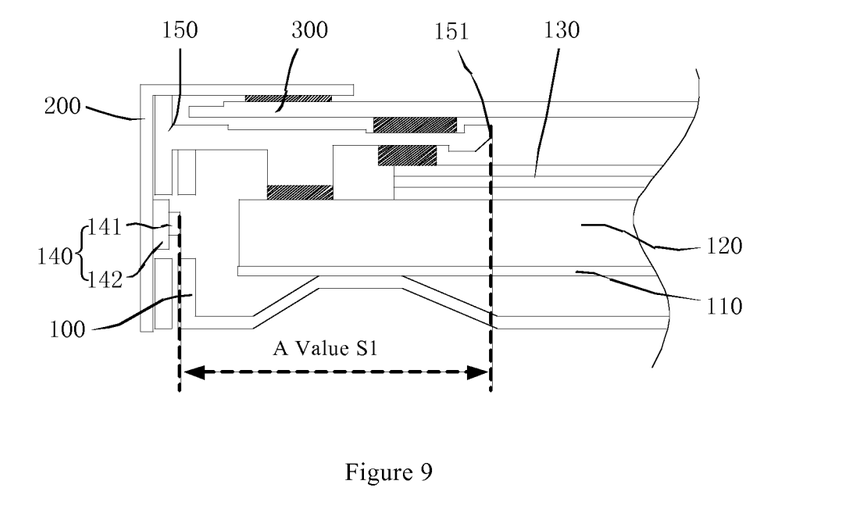
FIG. 9 is a simplified structure diagram of a backlight module of a third example of the invention.

In addition, FIG. 9 shows a third example of the invention. When the outer frame 200 is made of material with a good heat dissipation effect such as metal material, the lightbar 140 can be directly arranged on the outer frame, and directly dissipate heat via the outer frame. Thus, the heat sink can be removed, the production cost of the backlight module is saved, and the assembling efficiency is improved.

The technical scheme of the invention is described in accordance with the above specific examples. For the above specific examples, the structures of the backplane and the rubber frame will be changed if the lightbar is arranged on the outer frame. Of course, the invention can also have other examples which do not involve the structure change of the backplane or the rubber frame. For example, for some backlight modules, the rubber frame is not provided with side walls, and the lightbar is arranged on the outer frame without changing the structure of the rubber frame. Similarly, for some backlight modules, the backplane is not provided with side walls as well, for example, the front frame is employed to reversely fix the backplane or a backlight module without a backplane is employed (namely the components of the backlight module are fixed by the back frame of the LCD device), etc. Thus, the lightbar can still be arranged on the outer frame without changing the structure of the backplane to dissipate heat via the outer frame.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

We claim:

1. A backlight module, comprising: a rubber frame, a backplane, an LGP, a lightbar optically coupled with said LGP, and an outer frame; wherein said lightbar is arranged on said outer frame from an inner side of said backlight module; said rubber frame is provided with a rubber frame side wall in the position corresponding to said lightbar, and said rubber frame side wall is provided with a through hole for receiving said lightbar; said backplane is provided with a backplane side wall in the position corresponding to said lightbar, and said backplane side wall is provided with a through hole for receiving said lightbar; said lightbar further comprises heat sink(s) arranged thereon, said outer frame is provided with opening(s), and said heat sink is in contact with the outside air via said opening; said outer frame is provided with a lug boss extending to an inside of said backlight module in the position corresponding to said lightbar, and a thickness of said heat sink is less than or equal to a depth of said lug boss.

2. A backlight module, comprising: an LGP, a lightbar optically coupled with said LGP, and an outer frame; wherein said lightbar is arranged on said outer frame from an inner side of said backlight module.

3. The backlight module of claim 2, wherein said backlight module comprises a rubber frame; said rubber frame is provided with a rubber frame side wall in the position corresponding to said lightbar, and said rubber frame side wall is provided with a through hole for receiving said lightbar.

4. The backlight module of claim 2, wherein said backlight module comprises a backplane; said backplane is provided with a backplane side wall in the position corresponding to said lightbar, and said backplane side wall is provided with a through hole for receiving said lightbar.

5. The backlight module of claim 2, wherein said lightbar further comprises heat sink(s) arranged thereon; said outer frame is provided with opening(s), and said heat sink is in contact with the outside air via said opening.

6. The backlight module of claim 5, wherein the thickness of said heat sink exceeds that of said outer frame, and said heat sink is extended from said outer frame to an outside of said backlight module.

7. The backlight module of claim 5, wherein said heat sink is radiating fins.

8. The backlight module of claim 7, wherein said opening is a through hole with a size equivalent to an overall size of said radiating fins.

9. The backlight module of claim 7, wherein said outer frame is made of material with a good heat dissipation effect; said openings comprises a plurality of notches, each of which respectively corresponds to each fin of the radiating fins, and said radiating fins are inserted in said notches.

10. The backlight module of claim 5, wherein said outer frame is provided with a lug boss extending to an inside of said backlight module in the position corresponding to said lightbar.

11. The backlight module of claim 10, wherein a thickness of said heat sink is less than or equal to a depth of said lug boss.

12. An LCD device, comprising: a backlight module; wherein said backlight module comprises an LGP, a lightbar optically coupled with said LGP, and an outer frame; said lightbar is arranged on said outer frame from an inner side of said backlight module; wherein said lightbar further comprises a heat sink(s); said outer frame is provided with opening(s), and said heat sink is in contact with the outside air via said opening; wherein said outer frame is provided with a lug boss extending to the inside of said backlight module in the position corresponding to said lightbar; a thickness of said heat sink is less than or equal to a depth of said lug boss.

13. The LCD device of claim 12, wherein said backlight module comprises a rubber frame arranged inside of the outer frame; said rubber frame is provided with a rubber frame side wall in the position corresponding to said lightbar, and said rubber frame side wall is provided with a through hole for receiving said lightbar.

14. The LCD device of claim 12, wherein said backlight module comprises a backplane; said backplane is provided with a backplane side wall in the position corresponding to said lightbar, and said backplane side wall is provided with a through hole for receiving said lightbar.

15. The LCD device of claim 12, wherein the thickness of said heat sink exceeds that of said outer frame, and said heat sink is extended from said outer frame to an outside of said backlight module.

16. The LCD device of claim 12, wherein said heat sink is radiating fins.

17. The LCD device of claim 16, wherein said opening is a through hole with a size equivalent to an overall size of said radiating fins.

18. The LCD device of claim 16, wherein said outer frame is made of material with a good heat dissipation effect; said openings comprises a plurality of notches spaced from each other, each of which respectively corresponds to each fin of the radiating fins, and said radiating fins are inserted in said notches.

* * * * *